US005598668A

United States Patent [19]
Isom

[11] Patent Number: 5,598,668
[45] Date of Patent: Feb. 4, 1997

[54] ADJUSTABLE BUILDING FRAME

[76] Inventor: Fred S. Isom, 3411 1/2 Heyward St., Columbia, S.C. 29205

[21] Appl. No.: 539,191

[22] Filed: Oct. 4, 1995

[51] Int. Cl.$^6$ ..................................................... E04B 1/32
[52] U.S. Cl. ..................... 52/86; 52/64; 52/81.3; 135/118; 135/119; 135/120.3; 135/121; 135/140; 135/142; 135/138
[58] Field of Search .................................. 52/79.1, 79.4, 52/81.2, 81.3, 86, 64; 135/114, 115, 118, 119, 120.3, 121, 124, 140, 142, 138

[56] References Cited

U.S. PATENT DOCUMENTS

| | | |
|---|---|---|
| 246,118 | 8/1881 | Garver . |
| 1,061,547 | 5/1913 | Kennedy et al. ........................ 135/138 |
| 2,144,747 | 1/1939 | Adams . |
| 2,182,283 | 12/1939 | Curtis ..................................... 135/119 X |
| 2,488,809 | 11/1949 | Denn . |
| 2,565,746 | 8/1951 | Turner .................................... 135/138 X |
| 2,771,896 | 11/1956 | Call ........................................ 135/140 |
| 2,964,759 | 12/1960 | Riggs . |
| 3,051,185 | 8/1962 | Reynolds . |
| 3,165,110 | 1/1965 | Brooks . |
| 3,423,767 | 1/1969 | Crook . |
| 3,424,178 | 1/1969 | Yoshimi Yazaki . |
| 3,441,037 | 4/1969 | Transeau ............................ 135/120.3 X |
| 3,480,023 | 11/1969 | McConnell et al. . |
| 3,855,643 | 12/1974 | Sanford et al. . |
| 3,957,069 | 5/1976 | Denaro .................................... 135/118 |
| 3,995,649 | 12/1976 | Robichaud . |
| 4,091,584 | 5/1978 | Brown ....................................... 52/86 X |
| 4,257,132 | 3/1981 | Kerby ................................... 135/138 X |
| 4,414,993 | 11/1983 | Gillis . |
| 5,255,698 | 10/1993 | Riley . |
| 5,487,402 | 1/1996 | Clary ..................................... 135/119 X |

FOREIGN PATENT DOCUMENTS

| | | | |
|---|---|---|---|
| 1115615 | 4/1956 | France ..................................... 135/118 |
| 1159914 | 7/1958 | France ................................. 135/120.3 |
| 1276112 | 10/1961 | France ..................................... 135/140 |

Primary Examiner—Carl D. Friedman
Assistant Examiner—Aimee E. McTigue
Attorney, Agent, or Firm—Michael A. Mann, P.A.

[57] ABSTRACT

The invention is an adjustable building frame comprising a plurality of interfitting parts. The frame includes a base having a pair of opposing receiving surfaces and several parallel roof members received and connected by and between the receiving surfaces. The roof members are generally perpendicularly to the opposing receiving surfaces of the base. Each roof member comprises at least two telescoping sections which may be telescoped together or apart to adjust the length of the roof member. Increasing the length of each roof member of the frame increases the height and volumetric area defined by the frame, and decreasing the length of the roof members decreases the height and volumetric area defined by the frame. A flexible cover is attachable to the roof members by a plurality of clasps or a flexible but more rigid cover is attachable to the roof members by a series of bolts. The cover ideally overlaps itself, so that it will expand or retract as the height of the frame is adjusted.

18 Claims, 2 Drawing Sheets

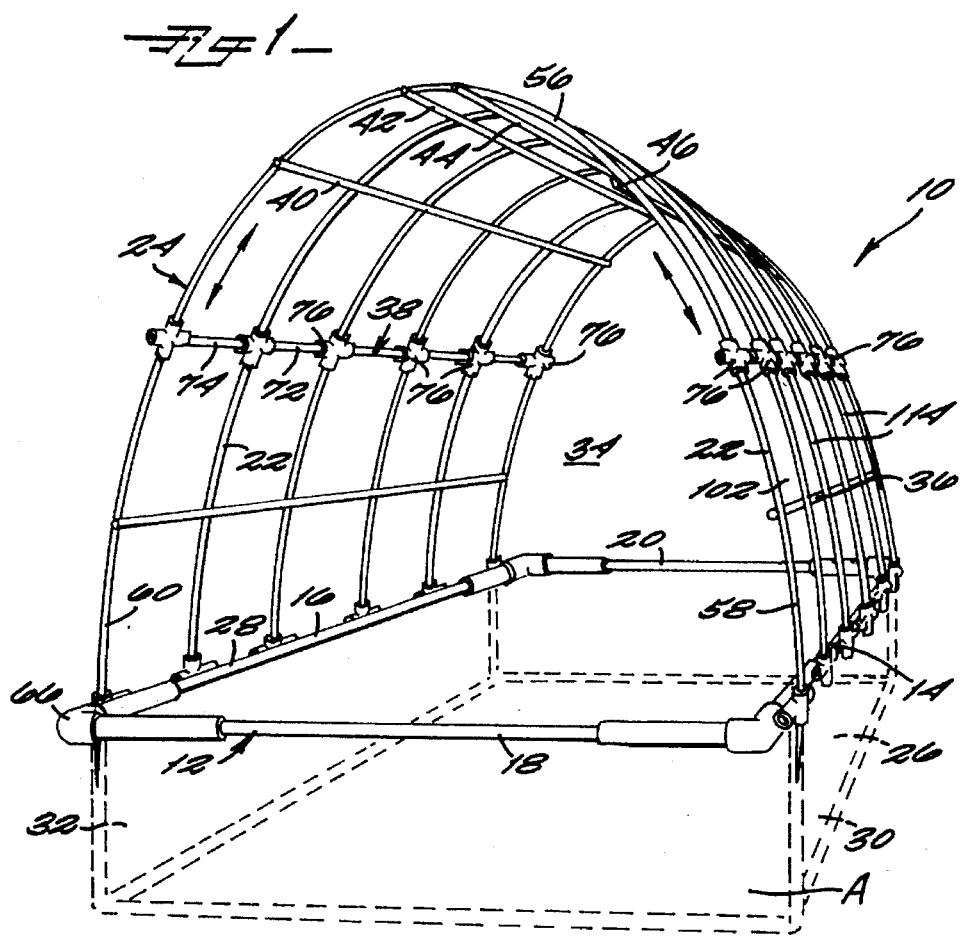

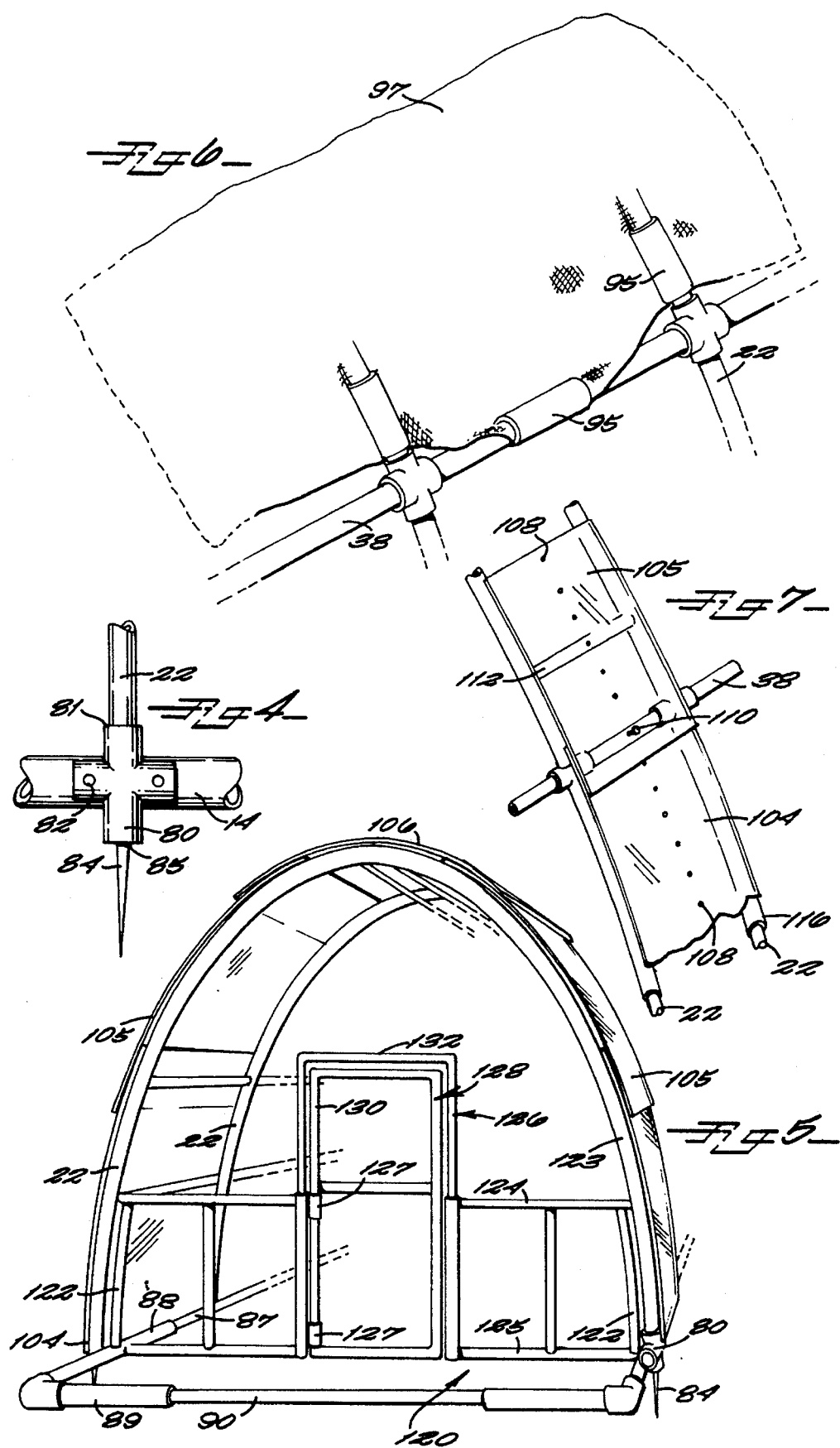

ADJUSTABLE BUILDING FRAME

BACKGROUND OF THE INVENTION

1. Field of the Invention

The present invention relates to lightweight modular structures in general and more particularly to an adjustable frame for supporting a lightweight modular building.

2. Discussion of Background

Modular frame structures comprised of interfitting members are commonly used for making lightweight, non-permanent or semi-permanent buildings, including greenhouses, tents, screened-in patios, and storage buildings.

For example, U.S. Pat. No. 5,255,698 describes a tent frame having a pair of opposing A-frame ends and center T-support member. The frame can be collapsed for transportation or storage and then quickly set up when needed.

U.S. Pat. No. 3,165,110 describes a lightweight modular building frame which is supported by a plurality of resilient arcuate members. The resilient support members are held together with rigid connecting members. U.S. Pat. No. 3,051,185 discloses an arched shelter structure similar to that of U.S. Pat. No. 3,165,110, except that in U.S. Pat. No. 3,051,185 the arched members are rigidly arched and not resiliently bent into an arched configuration.

It is known to provide a building of a plurality of lightweight interfitting parts so that the frame can be easily assembled, disassembled and transported. It is also common, as in the flames described in U.S. Pat. Nos. 5,255,698 and 3,480,023, to provide a foldable building frame which can be maintained in an assembled configuration, but folded for convenience in transportation or storage.

None of the above frames, however, can be easily adjusted in size so that a single frame can be adjusted to meet different purposes. This is unfortunate, because for greenhouses in particular, it would be advantageous to adjust the height of the frame supporting the greenhouse so that the greenhouse can be configured to accommodate the different growth rates of different vegetation. This will not only reduce the amount of covering material required for the greenhouse during certain months, but will also reduce the air volume within the greenhouse. By reducing the air volume within the greenhouse, the total amount of air that is required to be heated in the colder months by an external heating source is also reduced.

The utility of any modular lightweight building frame would be enhanced if the height, length and width could be independently and simultaneously adjusted. In a storage building, for example, a size adjustment feature greatly facilitates efficient use of space.

There remains a need for a lightweight modular frame comprising a plurality of interfitting parts that enables the frame to be easily enlarged or reduced in size, and adjusted in place without adding or subtracting components from the structure.

SUMMARY OF THE INVENTION

According to its major aspects and broadly stated, the present invention is a frame for supporting a non-permanent building such as a greenhouse, a tent, a screened-in patio, or a storage building.

The frame includes a rectangular base comprising a pair of opposing bottom members connected by a pair of opposing side members. A plurality of roof members bridge the bottom members. Preferably, the roof members are resilient straight tubular members. When bridging the bottom members, they are bent or arched and held in the arched configuration by their attachment to the bottom members. Transverse support members are attached perpendicularly across the roof members to stabilize the roof members and to support the frame.

Each roof member comprises at least two, and preferably three or more, sections which fit together in a telescoping fashion. The roof can be lengthened or shortened by extending or shortening the telescoping sections. When a frame's telescoping sections are extended and the size of the base is kept constant, the height of the roof section is increased, and the volume defined by the frame is increased. This step is performed by adjusting the sections in place and does not require the addition of other sections.

Increasing the height of the frame and the volume defined by the frame is advantageous for several reasons. For example, if the frame is for use as a greenhouse, then increasing the size of the frame accommodates plant growth. Reducing the size of a greenhouse during cooler months helps to maintain warmer air near vegetation in the greenhouse. Additionally, in the colder regions, if external heat is supplied to the greenhouse to maintain a suitable temperature for the vegetation, the reduction in air volume reduces the amount of air which must be heated, and thus the cost of heating this air.

The bottom members and the side members of the frame can also be telescoping so that the length and width of the base is adjustable. By adjusting the width of the bottom members and adding or subtracting roof members, the width of the frame may be adjusted. By adjusting the length of the side members without adjusting the length of the roof members, the height of the frame may be adjusted. Providing a frame having a size that is easily adjustable, generally allows the frame to be adjusted to a size that makes efficient use of space. Furthermore, the adjustability of the length, width, and height allows the structure to be custom fit to preexisting gardens or other items wished to be covered.

The frame of the present invention is preferably made of lightweight, non-corrosive, durable yet resilient material, such as fiberglass or polyvinyl chloride (PVC). Preferably, the frame is made of PVC tubing. However, it is important that the frames be of a non-custom made material and shape, so that replacement parts are readily available to the consumer. The various members of the frame are connected together by four-way pipe fittings, three-way pipe fittings, and pipe elbows. Roof members of the frame are attached to bottom members of the frame using four-way pipe firings. To prevent lateral shifting of the frame, the downward pointing section of each four-way pipe fitting is capable of engaging a stabilization bar that has been installed in the ground.

Depending on the application, various covering materials can be applied over the frame. For example, if the frame is to be used as a greenhouse, then clear plastic can be applied over the frame. If the frame is used to support a tent, the frame can be covered with canvas or vinyl. Material applied to the frame can be attached to the frame using clasps which engage a roof member or a support member to secure a section of the material to the frame.

In one embodiment of the invention, the covering for the frame comprises a plurality of flexible Plexiglas sheets. The sheets are overlapped on the frame and secured to the frame in rows defined by neighboring roof members. Overlapping the sheets serves two purposes. First, overlapping the sheets provides effective drain-off of rain falling on the covering, and second, overlapping the sheets allows the length of a row of sheets to be easily adjusted to accommodate an adjustment in the length of the roof members.

A major feature of the invention is the frame, which comprises a plurality of adjustably sized parallel roof members bridging a pair of bottom base members. The roof members can be adjusted in length to change the height and volume defined by the frame.

Another and more particular feature of the invention is the forming of the roof members from a plurality of telescoping sections. By forming the roof members from telescoping sections, the length of each roof member, and thus the height of the frame, can be adjusted. Importantly, this adjustment is possible without adding additional members.

Still another feature of the invention is the implementation of a four-way pipe fitting to attach a roof member of the frame to a bottom member of the frame. Use of a four-way pipe fitting provides a convenient point at which to install anchors in the ground to prevent the lateral movement of the structure with respect to the ground.

Another important feature of the invention are the clasps which are used to attach a covering material to the frame. Use of a clasp according to the invention enables the covering material to be changed easily, or extended in the event the size of the frame is increased.

Other features and advantages of the present invention will be apparent to those skilled in the art from a careful reading of the Detailed Description of a Preferred Embodiment presented below and accompanied by the drawings.

BRIEF DESCRIPTION OF THE DRAWINGS

In the drawings,

FIG. 1 is a perspective view of the frame according to a preferred embodiment of the present invention;

FIG. 2 is a fragmentary perspective view of the frame illustrating the connection between telescoping sections of a roof member according to a preferred embodiment of the present invention;

FIG. 3 is a perspective view of a template used to form holes in a frame member of the invention according to a preferred embodiment of the present invention;

FIG. 4 is a fragmentary perspective view of the frame illustrating the connection between a roof member and a bottom member according to a preferred embodiment of the present invention;

FIG. 5 is a perspective view of a frame according to the invention showing attachment of a door frame to the frame according to a alternative embodiment of the present invention;

FIG. 6 is a fragmentary perspective view of the frame illustrating attachment of covering to the frame using a clasp according to the invention according to a preferred embodiment of the present invention; and FIG. 7 is a fragmentary perspective view of a frame according to the invention showing attachment of a Plexiglas sheet covering to the frame according to a alternative embodiment of the present invention.

DETAILED DESCRIPTION OF PREFERRED EMBODIMENTS

A frame according to the invention is illustrated in FIG. 1. Frame 10 includes a base 12 having a pair of opposing bottom members 14 and 16 connected by a pair of opposing side members 18 and 20. Roof members 22 are attached across bottom members 14 and 16 to define roof 24 of frame 10. Base 12 may be also be provided, for example, by a platform. The important requirement of base 12 is that base 12 include generally parallel opposing first and second receiving surfaces for receiving roof members 22. In the embodiment of FIG. 1, first and second receiving surfaces are provided by tubular bottom members 14 and 16. Base 12 further may be provided by a rectangular box-type structure having a substantial height, as indicated by phantom structure "A" of FIG. 1. In the embodiment shown by phantom structure "A", receiving surfaces are provided generally at the top edges of top members 26 and 28 of forward and rear walls 30 and 32. A structure having a base as indicated by phantom structure "A" will have forward and rear walls 30 and 32, unlike the embodiment of FIG. 1.

Roof members 22 may be arched or of another shape (triangular, rectangular, pentagonal, hexagonal, etc.) defining an interior 34 of frame 10. Preferably, however, roof members 22 are straight resilient members which are bent to form an arch when their ends are attached to bottom members 14 and 16. Transverse support members 36, 38, 40, and 42 are attached generally perpendicular to roof members 22 to stabilize roof members 22 and thereby support frame 10.

Now referring to FIG. 2, the arrangement of a typical roof member will be described in detail. Each roof member 22 comprises at least two, and preferably three or more, telescoping sections, for example, 47, 48 and 49. Each telescoping section 47, 48 and 49 has holes 50 formed throughout its length to enable the telescoping sections of a roof member 22 to be secured together so that the length of roof member 22 may be changed. Telescoping sections 47, 48 and 49 of a roof member 22 are secured together by a removable bolt 52, which extends through aligned holes 50 of a pair of adjoined telescoping sections 47, 48, and 49. For adjusting the length of a roof member 22, bolt 52 of a pair of adjoined telescoping sections 47, 48, and 49 is removed, sections 47, 48, and 49 are separated or converged until a different pair of holes 50 of the sections are aligned, and bolt 52 is reinstalled. Threading a wing nut onto bolt 52 allows bolt 52 to be easily tightened and removed.

A typical embodiment of the invention is shown in FIG. 1. Each roof member 22 of frame 10 includes a middle telescoping section 56 and two end telescoping sections 58 and 60, all of which are preferably made of PVC piping. Typically, middle telescoping section 56 has a diameter smaller than the interior diameter of end sections 58 and 60 so that it can telescope into end sections 58 and 60. Additional telescoping members can be added. For example, middle telescoping section 56 may be replaced with three telescoping sections, the center member having the smallest diameter such that roof member 22 comprises five telescoping sections. There is no requirement, of course, that the middle member have the smallest diameter or that there is a symmetrical progression to the diameters of the telescoping members of a roof member 22.

Frame 10 should be made of strong, but resilient tubing such as lightweight metal, fiberglass, or polyvinyl chloride (PVC). In one embodiment, frame 10 is constructed of PVC pipe, and the various sections of frame 10 are fitted together using PVC pipe fittings, including pipe elbows, three-way pipe fittings and four-way pipe fittings. In the embodiment of FIG. 1, pipe elbows 66 connect side members 18 and 20 to base members 14 and 16. Transverse support members such as 36, 40, 42, 44, and 46 may be applied over roof members 22 and may be secured to roof members by way of bolts 52 extending through aligned holes 50 of roof members 22 and transverse frame members 36, 40, 42, 44, and 46. Center transverse support member 38 may comprise several subsections such as 72 and 74. In the embodiment of FIG. 1, a four-way pipe fitting 76 connects end section 58 to middle section 56 of each roof member 22. Because middle section 56 telescopes through four-way pipe fitting 76 and into end section 58, it follows that center transverse support member 38 cannot be fitted through four-way pipe fitting 76. Thus, in the embodiment of FIG. 1, center transverse frame member 38 comprises several subsections such as 72 and 74, interposed between several four-way pipe fittings 76.

PVC pipe is a preferred material for the frame because the pipe is flexible yet strong, and is available in standard sizes which do not have to be modified significantly for use in making a frame according to the invention. In one preferred embodiment of the invention, for example, middle section 56 of each roof member 22 comprises a ready-made ten foot section of ¾ inch PVC pipe, and the end sections 58 and 60 of each roof member 22 are made from ready-made ten foot sections of 1 inch PVC pipe. Ultra-violet resistant "1120 SDR-21" PVC of the type manufactured by Silverline, Inc. may be used to make the frame of the invention.

When frame 10 is made from PVC pipe, the only modification necessary in forming the sections of roof members 22 and the transverse support members 36, 38, 40, 42, 44, and 46 is drilling holes in the pipe sections forming the frame. Holes 50 of roof members 22 and transverse frame members 36, 38, 40, 42, 44, and 46 are preferably formed equidistant from one another. For example, holes 50 may be formed on six inch centers. In this way, the various sections of pipe can easily be fit together so that several holes of each telescoping section are aligned regardless of the positioning of roof members 22. Forming equally-spaced holes 50 on the pipe sections also enables transverse support members 36, 38, 40, 42, 44 and 46 to be easily attached perpendicularly to roof members 22.

Holes 50 of the pipe sections may be formed using a template 55, as shown in FIG. 3. Template 55 is preferably a metal or rigid cylinder having an interior diameter slightly larger than that of the exterior diameter of a pipe section in which holes are to be drilled. Further, template 55 has a plurality of precision guiding holes 77 formed therein, which guide the drilling of holes 50 into the pipe sections. For drilling holes in a pipe section, a pipe section 47 is fitted into template 55 and firmly held in place while holes 50 are drilled in the pipe sections with the aid of the precision guiding holes 77 of template 55. Holes 50 of several pipe sections can be formed simultaneously by fitting an additional pipe 48 or pipes within the first pipe installed in template 55. In addition to having outward facing holes 50 which are used primarily to attach pipe sections of the frame together, each roof member 22 and support member such as 36 preferably has sideward holes 51 formed along its length, as best seen in FIG. 2. Sideward holes 51, as well as outward holes 50, not used for connecting pipe sections together, provide convenient points at which apparatuses such as pipe hangers, hooks, sprinklers, and additional support braces which may be attached to frame 10.

As shown in FIG. 4, roof members 22 may be connected to a bottom member 14 by way of four-way pipe fittings 80. Each roof member 22 is fitted into the top opening 81 of each four-way pipe fitting 80, and each four way pipe fitting 80 is attached to bottom member 14 by bolts 82, driven laterally through holes formed in the side of each pipe fitting 80 and bottom member 14. Using four-way pipe fitting 80 to connect roof members 22 to bottom members 14 and 16 of frame 10 allows frame 10 to be easily stabilized to prevent shifting or slipping of frame 10 on the ground. Frame 10 is stabilized by installing reinforcement bars 84 in the ground equidistant from one another, and the same distance apart from one another as four-way pipe fittings 80 connecting roof members 22 to bottom members 14 and 16. Frame 10 is stabilized by lowering frame 10 on the ground such that downward-pointing openings 85 of four-way pipe fittings 80 fit over installed reinforcement bars 84, as illustrated in FIG. 4. Frame 10 can be further anchored on the ground by installing mobile home anchors in the ground and then attaching frame 10 to the mobile home anchor.

Once assembled, frame 10 may be easily increased or decreased in size. Frame 10 may be increased or decreased in size by removing bolts 52 securing middle section 56 to end sections 58 from a row of roof members 22 at one or both sides of frame 10. Middle and end sections 56 and 58, respectively, are then pushed together or pulled apart, and securely reattached by bolting through another set of aligned holes 50, to change the length of the roof members 22 and thus, the size of frame 10. If roof members 22 are formed from resilient, substantially straight sections, then each roof member 22 will assume a substantially symmetrical arcuate shape when connected to the bottom members 14 and 16.

In addition to telescoping roof members 22, frame 10 of the present invention may have telescoping bottom members such as 87 and 88, and telescoping side members such as 89 and 90, as shown in FIG. 5. It is understood that there will be a corresponding bottom member opposing bottom member 87, 88 and an opposing side member 89, 90 as shown in FIG. 5. Adjusting the length of bottom members 87, 88 allows the depth of frame 10 to be adjusted. To increase the depth of frame 10, telescoping sections of bottom members 87, 88 are pulled apart and secured in the lengthened position, and additional roof members 22 are bridged across the lengthened bottom members 87, 88 and corresponding opposing bottom members. To decrease the depth of frame 10, excess roof members 22 connected between bottom members 87, 88 and the opposing corresponding side members are removed, and bottom members 87, 88 are pushed together and secured.

To increase the width of frame 10, side member telescoping sections 89 and 90 are pulled apart and secured. For decreasing the length of frame 10, telescoping sections 89, 90 are pushed together and secured. Side members 89, 90 are moved and secured in a similar fashion to bottom members 87, 88.

It should be noted that it may be necessary to lift frame 10 from anchors 84, so that the width and length of frame 10 may be changed. Furthermore, it can be seen that as the width of frame 10 is changed, the height of frame 10 also changes. By increasing the width of frame 10, the height of frame 10 is reduced, and by decreasing the width of frame 10, the height of frame 10 is increased, assuming the telescoping sections of roof members 22 remain the same.

Providing a modular frame having a size that can be easily reduced or increased is advantageous for several reasons. If frame 10 is used in a structure which houses persons or objects, then frame 10 can be adjusted to a size no larger than is necessary. Thus, frame 10 can be adjusted to a size that makes efficient use of space. Adjusting the size of frame 10 also provides an advantage in terms of heat conservation and heat transfer. In cooler months, the height of frame 10 can be lowered so that heat is retained near objects, persons, or vegetation inside frame 10. In fact, different ends of frame 10 can be adjusted to accommodate different growth rates for different vegetation. In certain colder regions, this is a very important feature, because external heat is usually necessary to maintain a suitable temperature within the greenhouse. Therefore, by optimally using all of the space within the greenhouse, less air is required to be heated, thus reducing the corresponding cost of heating the air. Adjustability of the height and size of frame 10 is also especially advantageous, because a reduced sized frame 10 will therefore decrease the amount of covering required. In the warmer months, when heat must be released from within a covered frame 10, any suitable ventilation system will suffice. This ventilation system can merely be removing a section of the cover, thus exposing the interior of frame 10 to the outside air.

The covering that is applied to frame 10 will depend on the purpose for which frame 10 is used. If frame 10 is used to support a greenhouse, for example, then the covering will be clear plastic sheeting. If frame 10 is used to support a tent, then the covering may be vinyl or canvas sheeting. While the covering for the frame can be formed from several small sheets, the covering is preferably formed from a single large sheet of material or from a small number of large sheets.

The covering for frame 10 is attached to frame 10 generally by draping a sheet 97 over frame 10 and then clamping sheet 97 to roof members 22 and transverse support member 38 of frame 10, using specially designed clasps 95. Referring to FIG. 6, clasp 95 according to the present invention is designed as a resilient two-thirds to three-quarters cylinder having an interior radius of about equal to or less than that of a frame member. Since roof member 22 is formed from two or more telescoping sections, clasps 95 of various sizes will normally be required. A section of sheet 97 is secured to members 22 and 38 by installing clasp 95 over a sheet-covered frame member 22 or 38 to clamp sheet 97 into position on members 22 and 38, as illustrated in FIG. 6. Clasps 95 of the invention secure sheet 97 to frame 10 by the mechanical force alone. Glues, adhesives, or roofing tar are normally not required.

The number of clasps 95 required to secure a covering to frame 10 will normally depend on the number of sheets 97 that comprise the covering. If several sheets 97 are used, then they should be applied in rows starting from the bottom of the frame upward. Additional sheets 97 are applied over the initial sheet in a stepwise fashion, so that rain running off the sheets 97 will not enter the interior of frame 10.

In one embodiment of the invention, the covering for frame 10 is provided by a plurality of overlapping thin Plexiglas sheets, which may be ⅛ inch thick "ACRYLITE FF" Plexiglas sheets of the type manufactured by Cyro, Inc. of Arlington, Va. As shown in FIGS. 5 and 7, several Plexiglas sheets are attached to frame 10 in rows defined by adjacent roof members 22. In each row, the sheets of Plexiglas are applied to frame 10 in a stepwise fashion. Bottom sheet 104 is attached to abut bottom members 14, 16 or 87, 88 and its corresponding opposing bottom member. Consecutive sheets are applied to overlap the previous sheet, forming intermediate sheets 105, until a top sheet 106 is attached to overlap two intermediate sheets 105 sheets as shown in FIG. 5. Overlapping of sheet 104, 105, 106 serves two purposes. First, overlapping sheets 104,105, 106 provides effective drain-off of rain falling on the covering, and second, overlapping the length of a row of sheets 104, 105, 106 to be easily adjusted to accommodate an adjustment in the length of the roof members 22. Sheets 104, 105, 106 are secured to frame 10 and to one another using bolts 110, which penetrate through aligned middle-holes 108 of overlapping sheets 104, 105, 106. As shown in FIG. 7, each sheet 104, 105, 106 has formed thereon middle holes 108 throughout its length, which, like holes 50 of the roof members 22 and support members 38, are preferably formed on 6 inch centers. Bolts 110 penetrating through a pair of overlapping sheets 104, 105, are also bolted through a transverse support member 38. By tightening bolt 110 against transverse support member 38, the pair of overlapping sheets 104, 105 are clamped against one another and against the frame's 10 roof members 22. When roof members 22 are adjusted in length, bolts 110 securing sheets 104, 105, 106 to frame 10 are removed, and another set of holes of an overlapping pair of sheets 104, 105, 106 are aligned and then bolted again to transverse frame member 38. For additional securing force, brace members, such as 112, may be attached between a pair of adjacent roof members 22. Each brace member 112 will receive a bolt 110 in the same way as a transverse frame member 38 on which sheet 104, 105, 106 is secured. Brace members 112 will most often be needed at the end rows of frame 10 to close gaps between sheets 104, 105, 106 and frame 10, which otherwise would allow the entry of air therein upon a gust of wind.

Before sheets are attached to roof members 22 of frame 10, a buffer material should be applied to roof members 22 to receive sheets 104, 105, 106. For example, foam pipe insulation sections 116, such as foam self-seal pipe insulation sections of the type manufactured by Armstrong Corporation, may be applied to the roof members as shown in FIG. 7. When sheets 104, 105, 106 are clamped downward onto insulation sections 116 covering the roof members 22, insulation sections 116 become depressed to tightly seal against Plexiglas sheets 104, 105, 106.

If frame 10 is used to support a greenhouse, it is not necessary that the covering of the frame be absolutely watertight. Nevertheless, Plexiglas sheets 104, 105, 106 covering frame 10 can be made to be essentially watertight with use of caulk, sealants, or roofing tar. For example, "SILICONE II" window and door sealant of the type manufactured by General Electric Corporation of Waterford, N.Y., may be applied to seal gaps between sheets 104, 105, 106 and roof members 22 or insulation sections 116, and unused middle holes 108 of the Plexiglas sheets 104, 105, 106.

Frame 10 may also include a door frame assembly 120 as shown in FIG. 5. Door frame assembly 120 includes side bars 122 attachable to end roof members 123 of frame 10. Lateral members 124 and 125 extend from side bars 122 to support door frame 126. Door frame includes hinges 127 for supporting door 128. In a preferred embodiment of the invention, both door 128 and door frame 126 include U-members 130 and 132 which telescope vertically from door 128 and door frame 126 respectively. It will often be desirable to change the height of the door by telescoping the U-members upward or downward if the height of frame 10 is changed. Door frame assembly 120 can be attached to side members 87, 88 and its corresponding opposing bottom members. If bottom members 89, 90 are stabilized and anchored in the ground, then side members 87 and 88 may be removed and door frame assembly may be attached so that bottom lateral members 125 abut the ground. Side bars 122 of door frame assembly 120 are preferably attached near the bottom of a sidewall roof member as shown, so that adjusting the length of roof members 22 will not substantially affect the curvature of roof members 22 in the section of roof member 22 where door frame assembly 120 is attached.

It will be clear to those skilled in the art to which the present invention pertains from a reading of the foregoing that many changes and substitutions can be made to the preferred embodiments without departing from the spirit and scope of the present invention, which is defined by the appended claims.

What is claimed is:

1. A frame for supporting a building, said frame defining a height, a volume, a width, and a length, said frame comprising:

a base having a first bottom member and an opposing second bottom member and a pair of opposing side members connecting said first and said second bottom member, each of said bottom members having a length, each of said side members having a length, said first bottom member defining a first receiving surface, said second bottom member defining a second receiving surface, said first and said second bottom members and said opposing sides each having at least one telescoping section whereby said length of said frame is adjusted by adjusting said length of said first and said second bottom members, and whereby said width of said frame is adjusted by adjusting said length of said opposing side members; and a plurality of elongated roof members, each roof member of said plurality of roof members having a first end and a second end, each roof member of said plurality of roof members having a length, said first end of said each roof member being received by said first receiving surface, said second end of each of said roof members being received by said second receiving surface, said each roof-member having a plurality of telescoping sections for enabling said length of said each roof member to be adjusted, whereby said height and said volume defined by said frame are adjusted by adjusting said length of said each roof member.

2. The frame of claim 1, wherein said each roof member comprises:

a middle section;

a first end section attached to said first receiving surface and telescopingly receiving said middle section; and a second end section attached to said second receiving surface and telescopingly receiving said middle section.

3. The frame of claim 1, wherein said each roof member comprises:

a middle section having middle bolt holes formed therein;

a first end section having first end bolt holes formed therein, said first end attached to said first receiving surface and telescopingly receiving said middle section so that one of said middle bolt holes and one of said first end bolt holes are aligned;

a first removable bolt extending through said aligned middle and first end bolt holes;

a second end section having second end bolt holes formed therein, said second end section attached to said second receiving surface and telescopingly receiving said middle section so that one of said middle bolt holes and one of said second end bolt holes are aligned; and a second removable bolt extending through said aligned middle and second end bolt holes.

4. The frame of claim 1, wherein said each roof member comprises a plurality of tubular telescopingly received sections, and wherein said frame further comprises:

a plurality of transverse support members attached generally perpendicularly across said plurality of roof members for stabilizing said roof members and supporting said frame.

5. The frame of claim 1, further comprising:

a plurality of transverse support members attached generally perpendicularly across said plurality of roof members;

a covering comprising at least one sheet applied over said frame;

a plurality of clasps applied over said covering and over several of said roof members and said transverse support members for clamping said covering to said frame.

6. The frame of claim 1, said frame having a plurality of tubular frame members, said each frame member having a diameter, said frame further comprising:

a covering comprising at least one sheet applied over said frame; and a plurality of clasps applied over said covering and over several of said frame members for clamping said covering to said frame members of said frame, said each clasp comprising a resilient two-thirds to three-quarters cylindrical member having a diameter of about equal to or slightly less than that of one of said frame members.

7. The frame of claim 1, wherein said base is adapted to rest on a ground surface, said frame further comprising:

a plurality of bottom four-way pipe fittings, each of said four-way pipe fittings connecting one of said roof members to one of said bottom members, each of said four-way pipe fittings having a downward-oriented opening; and a reinforcement bar adapted to be installed in said ground surface and extending upward from said surface, said reinforcement bar being received by one of said downward-oriented openings.

8. The frame of claim 11, wherein said plurality of roof members are arranged generally parallel to one another to define frame rows, each frame row having a length, said frame further comprising:

a plurality of sheets attached to said frame for covering said frame, said plurality of sheets being overlappingly attached to said frame in a plurality of rows of sheets, said each row of sheets being removably attached in one of said frame rows, said each sheet of each of said rows of sheets overlappingly abutting another of said sheets so that rain runs off said sheets, and said length of each of said rows can be adjusted.

9. The frame of claim 1, wherein said plurality of roof members are arranged generally parallel to one another to define frame rows, said frame further comprising:

a plurality of transverse support members, each of said plurality of transverse support members being attached generally perpendicularly across said roof members, each of said transverse support members having a plurality of transverse support member holes formed therein;

a plurality of sheets attached to said frame for covering said frame, said plurality of sheets including a plurality of rows of sheets, said each row of sheets being attached in one of said frame rows, said each sheet of each of said rows of sheets overlappingly abutting another of said sheets so that rain runs off said sheets, and the length of said each row of sheets can be adjusted, said each sheet having a plurality of middle holes formed therein, said plurality of sheets being positioned on said frame such that a middle hole of a first sheet aligns with a middle hole of an overlapping sheet and a transverse support member hole; and a removable bolt extending through said aligned holes of said overlapping sheets and said transverse support member, so that by tightening said bolt, said sheets are clamped together and against said frame.

10. The frame of claim 1, further comprising:

a door frame having a U-shaped telescoping door frame member extending upwardly therefrom for adjusting the height of said door frame;

a door having a U-shaped telescoping door member extending upwardly therefrom for adjusting the height of said door;

means for hingedly attaching said door to said door frame;

mounting means for mounting said door frame to said frame.

11. A building frame, said frame defining a height, a volume, a width, and a length, said frame comprising:

a base, said base having first and second opposing bottom members and a pair of side members, said base being adapted to rest on a ground surface;

a plurality of elongated roof members, each roof member of said plurality of roof members having a first end and a second end, said first end of said each roof member being received by said first bottom member, said second end of each of said roof members being received by said second bottom member, said each roof member having a plurality of telescoping sections for enabling the length of said each roof member to be adjusted, whereby the height and volume defined by said frame are adjusted by adjusting the length of said each roof member;

a plurality of bottom four-way pipe fittings, each of said four-way pipe fittings connecting one of said roof members to one of said bottom members, each of said four-way pipe fittings having a downward-oriented opening; and a plurality of reinforcement bars installed in said ground surface and extending upward from said surface, each of said reinforcement bars received by one of said downward-oriented openings.

12. The frame of claim 11, wherein said each roof member comprises:

a middle section;

a first end section attached to said first bottom member and telescopingly receiving said middle section; and a second end section attached to said second bottom member and telescopingly receiving said middle section.

13. The frame of claim 11, wherein said each roof member comprises:

a middle section having middle bolt holes formed therein;

a first end section having first end bolt holes formed therein, said first end attached to said first bottom member and telescopingly receiving said middle section so that one of said middle bolt holes and one of said first end bolt holes are aligned;

a first removable bolt extending through said aligned middle and first end bolt holes;

a second end section having second end bolt holes formed therein, said second end section attached to said second bottom member and telescopingly receiving said middle section so that one of said middle bolt holes and one of said second end bolt holes are aligned; and a second removable bolt extending through said aligned middle and second end bolt holes.

14. The frame of claim 11, wherein said each roof member comprises a plurality of tubular telescopingly received sections, and wherein said frame further comprises:

a plurality of transverse support members attached generally perpendicularly across said plurality of roof members for stabilizing said roof members and supporting said frame.

15. The frame of claim 11, further comprising:

a plurality of transverse support members attached generally perpendicularly across said plurality of roof members;

a covering comprising at least one sheet applied over said frame;

a plurality of clasps applied over said covering and over several of said roof sections and said transverse support members for clamping said covering to said frame.

16. The frame of claim 11, said frame having a plurality of tubular frame members, said each frame member having a diameter, said frame further comprising:

a covering comprising at least one sheet applied over said frame; and a plurality of clasps applied over said covering and over several of said frame members for clamping said covering to said frame members of said frame, said each clasp comprising a resilient two-thirds to three-quarters cylindrical member having a diameter of about equal to or slightly less than that of one of said frame members.

17. The building frame of claim 11, wherein each of said first and second bottom members comprises a plurality of bottom member telescoping sections, whereby the width of said frame is adjusted by adjusting the length of each of said bottom members.

18. A building frame, said frame defining a height, a volume, a width, and a length, said frame comprising:

a base having a first bottom member and an opposing second bottom member and a pair of opposing side members connecting said first and said second bottom member, each of said bottom members having a length, each of said side members having a length, said first bottom member defining a first receiving surface, said second bottom member defining a second receiving surface, said first and said second bottom members and said opposing sides each having at least one telescoping section whereby said length of said frame is adjusted by adjusting said length of said first and said second bottom members, and whereby said width of said frame is adjusted by adjusting said length of said opposing side members;

a plurality of elongated roof members, each roof member of said plurality of roof members having a middle section having middle bolt holes formed therein; a first end section having first end bolt holes formed therein, said first end attached to said first bottom member and telescopingly receiving said middle section so that one of said middle bolt holes and one of said first end bolt holes are aligned; a first removable bolt extending through said aligned middle and first end bolt holes; a second end section having second end bolt holes formed therein, said second end section attached to said second bottom member and telescopingly receiving said middle section so that one of said middle bolt holes and one of said second end bolt holes are aligned; and a second removable bolt extending through said aligned middle and second end bolt holes;

a plurality of transverse support members attached generally perpendicularly across said plurality of roof members for stabilizing said roof members and supporting said frame; and a covering comprising at least one sheet applied over said frame.

\* \* \* \* \*